(12) United States Patent
Pan

(10) Patent No.: US 8,850,495 B2
(45) Date of Patent: *Sep. 30, 2014

(54) ADVERTISEMENT DELIVERING SYSTEM BASED ON DIGITAL TELEVISION SYSTEM AND MOBILE COMMUNICATION DEVICE

(76) Inventor: Yang Pan, Singapore (SG)

( * ) Notice: Subject to any disclaimer, the term of this patent is extended or adjusted under 35 U.S.C. 154(b) by 540 days.

This patent is subject to a terminal disclaimer.

(21) Appl. No.: 12/856,588

(22) Filed: Aug. 14, 2010

(65) Prior Publication Data

US 2012/0042344 A1    Feb. 16, 2012

(51) Int. Cl.
| | |
|---|---|
| H04N 7/16 | (2011.01) |
| H04N 7/10 | (2006.01) |
| H04N 7/025 | (2006.01) |
| H04N 5/445 | (2011.01) |
| H04N 7/18 | (2006.01) |
| G06F 3/00 | (2006.01) |
| G06F 13/00 | (2006.01) |
| H04N 21/61 | (2011.01) |
| H04N 21/81 | (2011.01) |
| H04N 21/4725 | (2011.01) |
| G06Q 30/02 | (2012.01) |
| H04N 21/422 | (2011.01) |

(52) U.S. Cl.
CPC ....... *H04N 21/4725* (2013.01); *H04N 21/6125* (2013.01); *H04N 21/812* (2013.01); *G06Q 30/02* (2013.01); *H04N 21/42204* (2013.01)
USPC ............. 725/81; 725/23; 725/32; 725/60; 725/74; 725/80; 725/135; 725/136

(58) Field of Classification Search
USPC ....................................................... 725/112
See application file for complete search history.

(56) References Cited

U.S. PATENT DOCUMENTS

| | | | |
|---|---|---|---|
| 6,351,270 B1 | 2/2002 | Nishikawa et al. | |
| 6,718,551 B1 | 4/2004 | Swix et al. | |
| 7,269,837 B1 | 9/2007 | Redling et al. | |
| 7,308,698 B1 * | 12/2007 | Heughebaert et al. | 725/37 |
| 7,346,606 B2 | 3/2008 | Bharat | |
| 7,360,232 B2 * | 4/2008 | Mitchell | 725/112 |
| 2003/0018980 A1 * | 1/2003 | Gorbatov et al. | 725/133 |
| 2003/0110507 A1 * | 6/2003 | Dimitrova et al. | 725/110 |
| 2003/0167467 A1 | 9/2003 | Allen et al. | |
| 2004/0078814 A1 | 4/2004 | Allen | |
| 2005/0044577 A1 | 2/2005 | Jerding et al. | |
| 2005/0154996 A1 | 7/2005 | Othmer | |
| 2007/0089158 A1 * | 4/2007 | Clark | 725/135 |
| 2007/0291747 A1 | 12/2007 | Stern et al. | |
| 2009/0064219 A1 * | 3/2009 | Minor | 725/32 |
| 2009/0217317 A1 * | 8/2009 | White | 725/32 |
| 2010/0011304 A1 | 1/2010 | van Os | |
| 2010/0082455 A1 | 4/2010 | Rosenblatt et al. | |
| 2011/0218864 A1 * | 9/2011 | Pentz et al. | 705/14.71 |

* cited by examiner

Primary Examiner — Justin Shepard

(57) ABSTRACT

A system for delivering advertisements based on a digital television system and a mobile communication device is disclosed. The television system and the mobile device are connected in ad hoc manner when a program is broadcasted by the television system. When a user is attracted by an item in the program, an instruction is sent from a remote control device of the television system or from the mobile device to send a data file including a product identifier to the mobile device. The user may use a cursor controlled by the remote control device or by the mobile device to locate the item. An icon is displayed on a display screen of the mobile device to represent the received data file. When the icon is selected, the mobile device is connected to a data manager in the Internet to deliver more product information to the user.

7 Claims, 9 Drawing Sheets

ADVERTISEMENT DELIVERING SYSTEM BASED ON DIGITAL TELEVISION SYSTEM AND MOBILE COMMUNICATION DEVICE

CROSS-REFERENCE TO RELATED APPLICATIONS

Not applicable.

BACKGROUND

1. Field of Invention

This invention relates generally to advertising. More specifically, the invention relates to system and method for delivering advertisements to a mobile communication device.

2. Description of Prior Art

Advertising using television is well known. Unfortunately, even when armed with demographic studies and entirely reasonable assumptions about the typical audience of various media outlets, advertisers recognize that much of their advertisement budget is simply wasted. Moreover, it is difficult to identify and eliminate such waste.

Mobile communication devices have gained significant popularity in recent years. Users are using the mobile device such as, for example, iPhone from Apple Inc, Cupertino, Calif., to access the Internet services. Methods for delivering targeted advertisements to users by employing mobile communication devices have been developed. The targeted advertising messages may be delivered based upon the user's personal profile, location and history of the user's interaction with the device.

Even when sometimes the advertisements broadcasted by the television are attracted by a viewer, the information provided by the television is often insufficient for the viewer to make a purchasing related decision.

The adoption of digital television system has opened up new opportunities to deliver advertisements to targeted customers. The opportunities, however, have not been fully explored, in particularly, when the digital television system and the mobile communication devices are combined.

SUMMARY OF THE INVENTION

It is an object of the present invention to disclose a system and method for delivering highly targeted advertisements to a user of a digital television system and a mobile communication device.

In accordance with one embodiment of the present invention, the digital television (TV) system is used to deliver a program to a viewer. The program comprises a series of frames or images. Each frame of the program may include a number of items on a display screen. Some of items may be of commercial interests. The term "item" is used in the present disclosure to represent an image of an item on a display of the digital television system.

According to one aspect of the present invention, the digital television system includes a database. Each of the commercial items is linked to a product identifier in the database.

When a user is attracted by a commercial item displayed in a frame, he may use a remote control device to select the item. A data file including the product identifier of the selected item is then sent to a connected mobile communication device through an ad hoc communication link.

The received file may be represented by an icon on a display screen of the mobile device according to one implementation. The data file may include a product identifier related to the advertisement.

The user may select the icon for more detailed information about the product. Upon the selection of the icon by the user, the mobile device is connected to a data manager through the Internet. The information delivered to the user from the data manager may include but not limited to pricing, features, reliability, commercial terms and customer rating. The information may also include pricing comparison from different retailers. The user may decide to purchase the product through an on-line facility.

BRIEF DESCRIPTION OF THE DRAWINGS

For a more complete understanding of the present invention and its various embodiments, and the advantages thereof, reference is now made to the following description taken in conjunction with the accompanying drawings, in which.

DETAILED DESCRIPTION

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefits of this disclosure.

Figure 1:
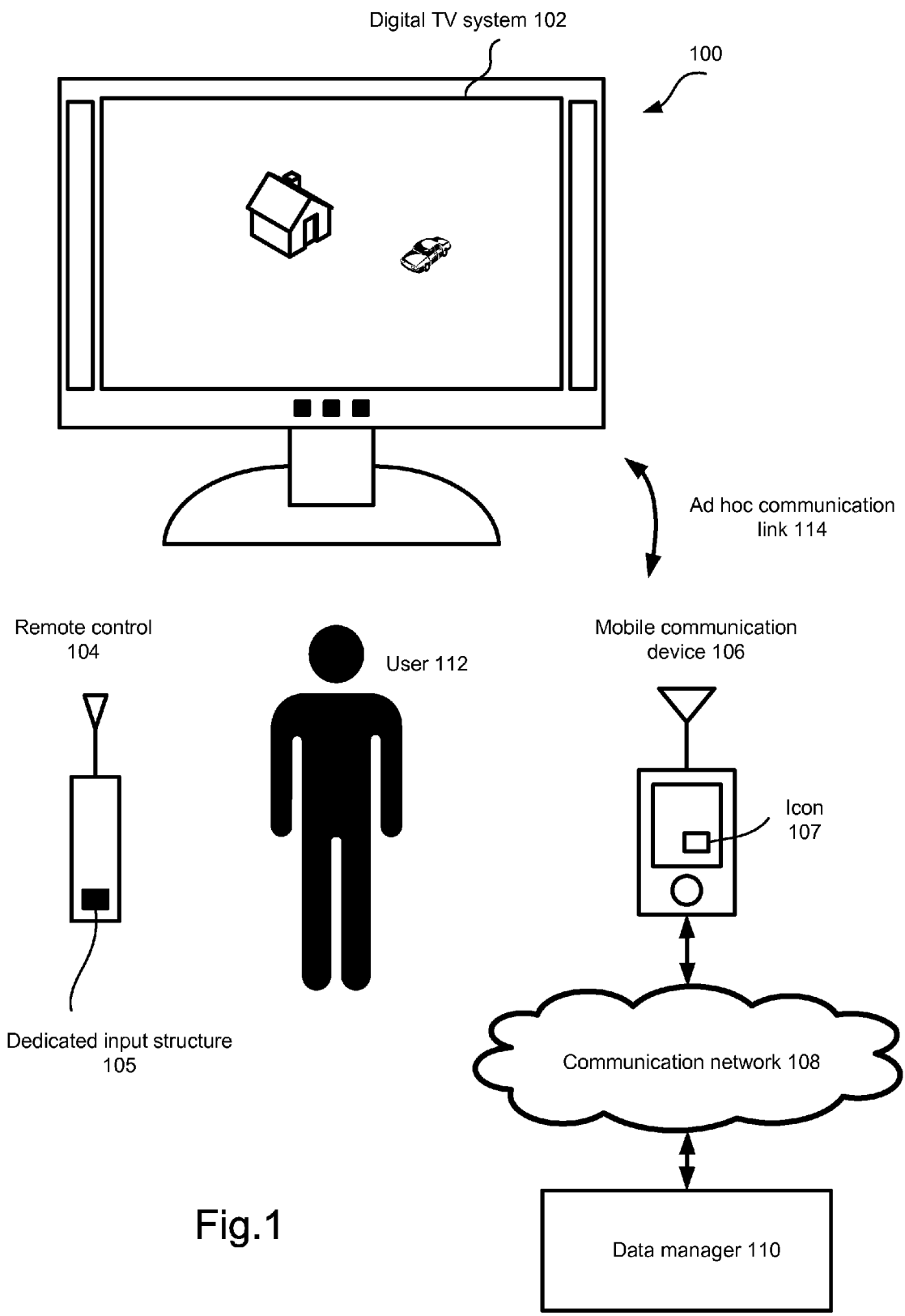
FIG. 1 is a schematic diagram of an advertisement delivery system based on a digital TV system and a mobile communication device in accordance to one embodiment.

FIG. 1 is a schematic diagram illustrating an advertisement delivery system according to one embodiment. The system 100 comprises a digital TV system 102 with a remote control device 104. The remote control device 104 may include a dedicated input structure 105 for controlling of selecting a displayed item. The input structure 105 may be a button, a touch pad or an icon in a touch sensitive display. The mobile communication device 106 may be a mobile phone with an Internet connection capability. The mobile device 106 is connectable to a data manger 110 through a public communication network 108. The public communication network 108 may the Internet. The mobile communication device 106 may include an icon 107 representing a commercial item selected by the user 112 on a displayed frame of a TV program. The remote control device 104 and the digital TV system 102 are connected through a well known method such as the Infrared communication interface in the art. The digital TV system 102 and the mobile device 106 may be connected using an ad hoc communication link 114. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC).

Figure 2:
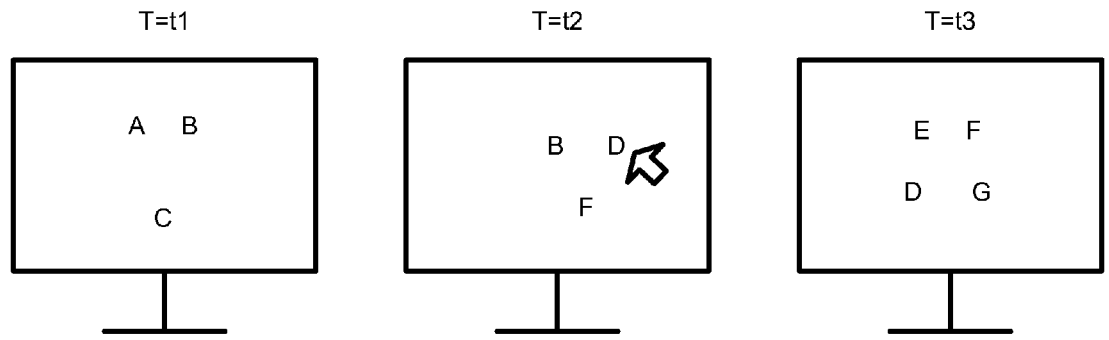
FIG. 2 is a schematic illustration that a series of frames are displayed during broadcasting of a program and displayed commercial items on the frames are linked to product identifiers and other advertisement files in a database.

FIG. 2 is a schematic illustration that a series of frames, being depicted as t1, t2 and t3 in an exemplary manner, are displayed on the top portion of the figure. Some of the displayed frames may include one or a number of commercial items. Some of the displayed frames may not include any commercial item. Each of the commercial items is linked to a product identifier as shown in the bottom portion of the figure. Some of the commercial items may also be linked to one or more advertisement files. Each program may have a different database. The database may be delivered from a server in a television network after a program is selected by the user. The database may be removed from the system after the completion of broadcasting the program.

When a user is attracted by a displayed item, he may use the remote control device 104 or the mobile device 106 to select the item. Upon the user's selection, a data file is generated including at least the product identifier of the selected item. The data file may be sent from the digital TV system 102 to the mobile device 106 through the ad hoc communication link 114.

The user may use the remote control device 104 and the mobile device 106 to move an optical mark such as a cursor on the screen of the digital TV system 102. After the item is pointed by the cursor, the user may use the dedicated input structure 105 to make the selection according to one implementation of the present invention. If the selected item does not have a product identifier or an advertisement message available in the database, a message may be displayed on the digital TV system 102 or on the display of the mobile device 106 to notify the user.

The user may also use the remote control device 104 or the mobile device 106 to get a still-standing frame before he makes a selection.

Figure 3A:
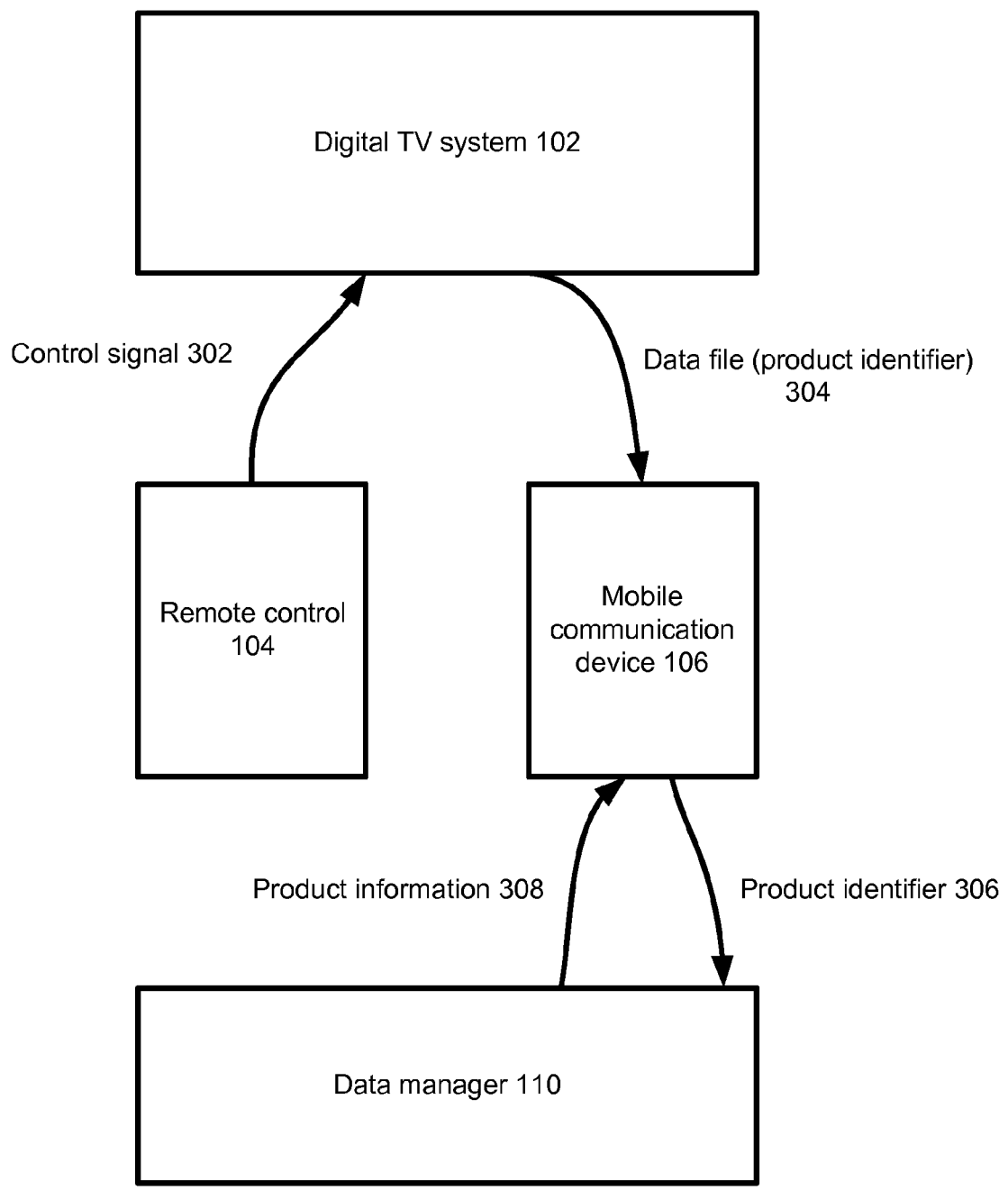
FIG. 3A is a schematic diagram of functional blocks and data flow of the system in accordance with one embodiment.

FIG. 3A is a schematic diagram of functional blocks and data flow of the system 100 in accordance with one embodiment. When a digital TV system 102 is used to broadcast a program, commercial items may be displayed at least on some of the frames of the program. When a user is attracted by a specific item on a displayed frame, he uses the remote control device 104 to make the selection. A control signal 302 is sent from the remote control device 104 to the digital TV system 102. Upon receiving the control signal 302, the digital TV system 102 sent a data file 304 to the mobile device 106. The received file is represented by an icon displayed on the display screen of the mobile device 106. If the icon is selected by the user 112, the product identifier 306 is sent to a data manager 110 through the Internet 108. The data manager 110 sends more detailed product information to the mobile device 106. The product information 308 may be presented using a web site displayed on the display screen of the mobile device 106. It should be noted that data file 304 sent from digital TV system 102 to the mobile device 106 may include contents other than the product identifier. For example, the data file may include a text message, an image, a voice message, video clip and a multimedia file related to the selected commercial item. The user may use the mobile device 106 to view the received advertising messages.

The remote control device 104 may include a dedicated input structure 105 for delivering the control signal 302. The dedicated input structure 105 may be a button, a touch pad, an icon in a touch sensitive screen or any other structure as known in the art. When the input structure is actuated, a processor in the remote control 104 receives the signal and sends the control signal to the digital TV system 102.

According to another implementation, one of the existing input structures of the remote control device 104 may be used to display a cursor on the screen of the digital TV system 102 After the selection using the remote control device 104, a control signal is generated to trigger the operation of sending the data file 304 to the mobile device 106.

Figure 3B:
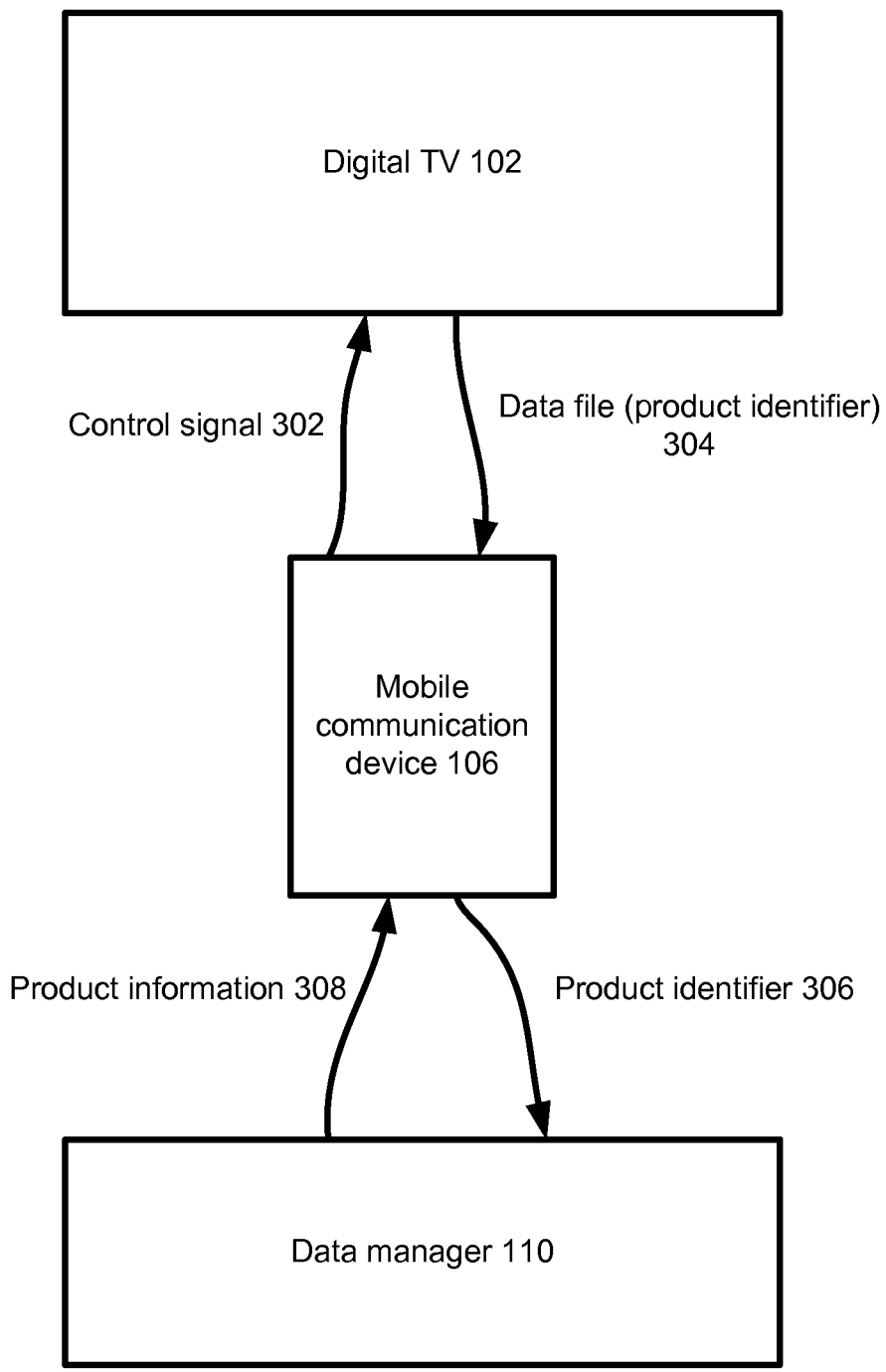
FIG. 3B is a schematic diagram of functional blocks and data flow of the system in accordance with another embodiment.

FIG. 3B is a schematic diagram of functional blocks and data flow of the system 100 in accordance with another embodiment. The mobile communication device 106 rather than the remote control device 104 is used to send the control signal 302 to the digital TV system 102. If the viewer is attracted by a displayed item, he may use the mobile device 106 to move an optical mark such as a cursor on the screen of the digital TV system 102. Upon the user's selection using the mobile device 106, a control signal 302 is sent to the digital TV system 102. The data file 304 is then sent to the mobile device 106. Similarly, the product identifier 306 may be sent to the data manger 112 and detailed product information 308 is sent to the mobile device 106 in a form of web site.

Figure 4A:
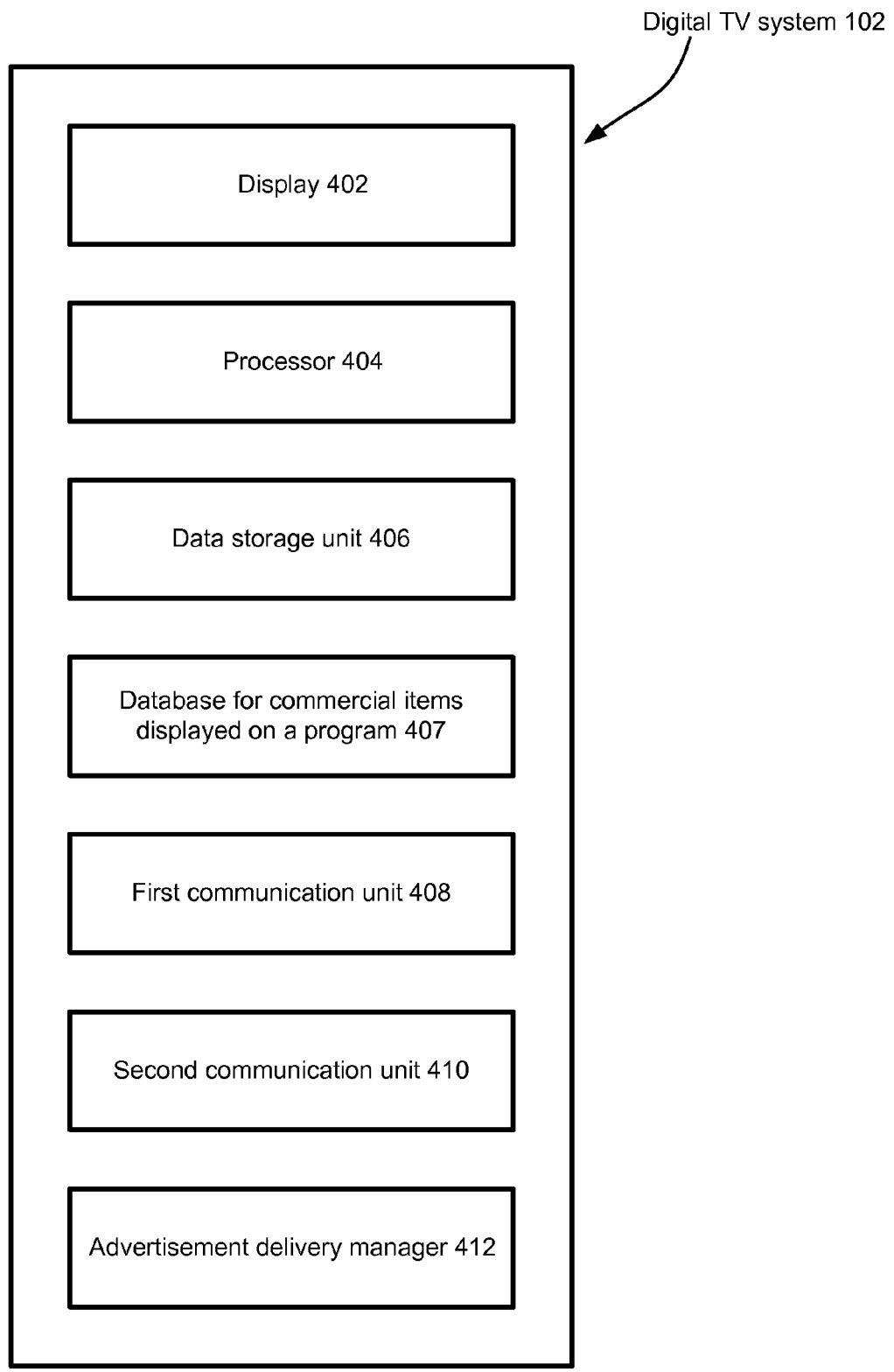
FIG. 4A is a schematic diagram of functional blocks of the digital TV system in accordance with one implementation.

FIG. 4A is a schematic representation of functional blocks of the digital TV system 102 in according with one embodiment. The system 102 comprises a display 402. The display may be a Liquid Crystal Display (LCD). The display may also be any other type of display as known in the art. A processor 404 is used to control the operation of the digital TV system 102. The processor 404 may include more than one type of processors including a general purpose processor such as a Central Processing Unit (CPU) and a special purpose processor such as a Graphical Processing Unit (GPU). The digital TV system 102 may also include a data storage unit 406 such as a magnetic storage unit and/or semiconductor memory devices. A database 407 is used to relate a displayed commercial item to a product identifier and/or to advertisement files.

The digital TV system 102 may be connected to a communication network through a first communication unit 408. The network may be a private broadband network for delivering TV programs. The network may also be a public network such as, for example, the Internet. A second communication unit 410 is used to connect the digital system 102 to the mobile device 106 through an ad hoc communication link 114. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC). The digital TV system 102 may also include a third communication unit (not shown in the figure) for connecting the system and the remote control device 104. Most remote control devices today use Infrared communication interfaces.

An advertisement delivery manager 412 is used to control the operation of the advertisement delivery. It may be implemented as a software program to be executed by the processor 404. It may also be implemented as a combination of the software and the hardware.

Figure 4B:
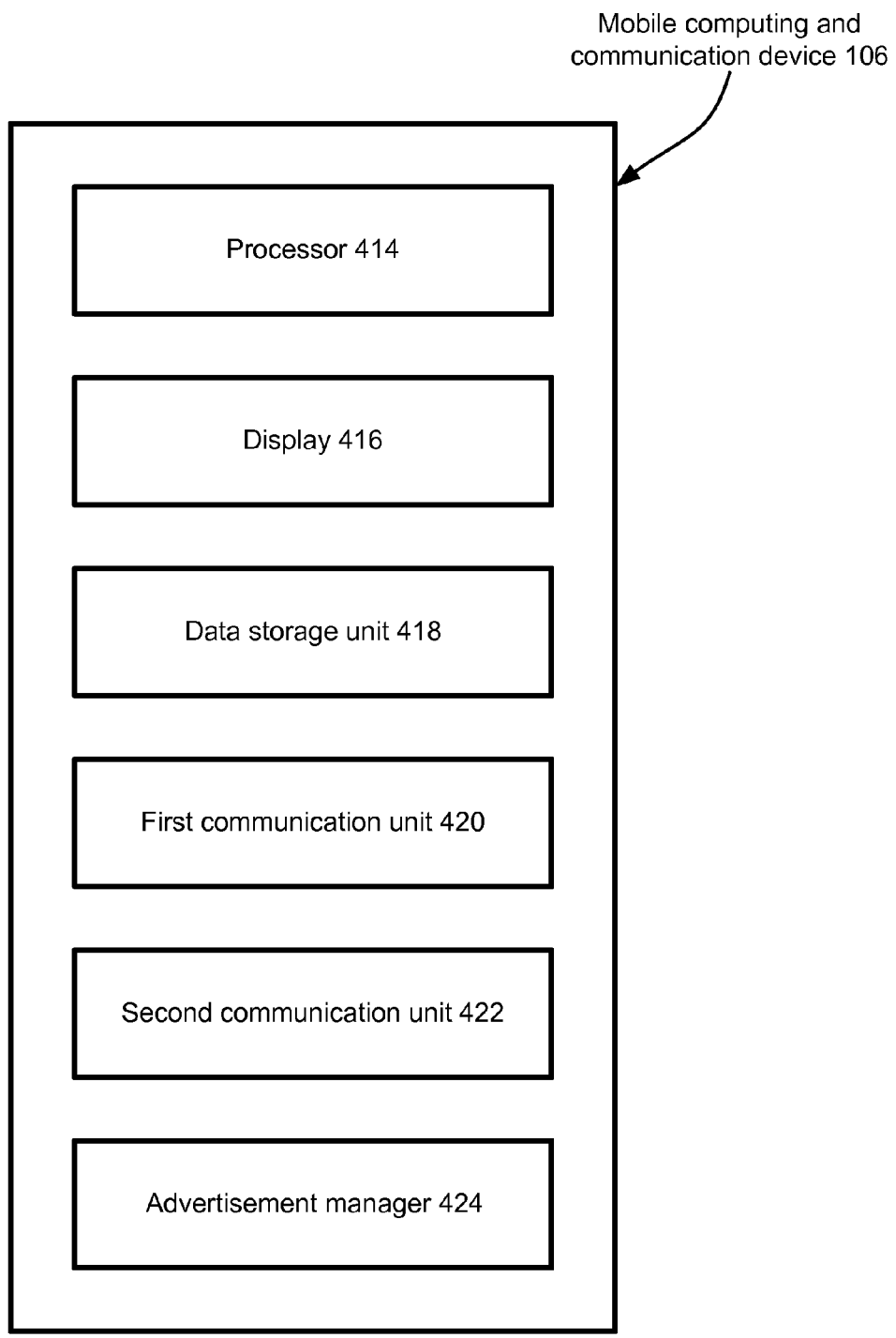
FIG. 4B is a schematic diagram of functional blocks of the mobile communication device in accordance with one implementation.

FIG. 4B is a schematic representation of functional blocks of the mobile communication device 106. The device 106 comprises a processor 414, a display 416, a data storage unit 418 and a first communication unit 420 as known in the art. The first communication unit 420 may be a standard network interface for a smart phone including a capability to connect to the Internet. The device 106 further comprises a second communication unit 422 for connecting to the digital TV system 102 through the previously mentioned ad hoc communication link 114. An advertisement manager 424 is used to control the operation of receiving the data file 304 and to display an icon to represent the received data file in an exemplary implementation.

Figure 5:
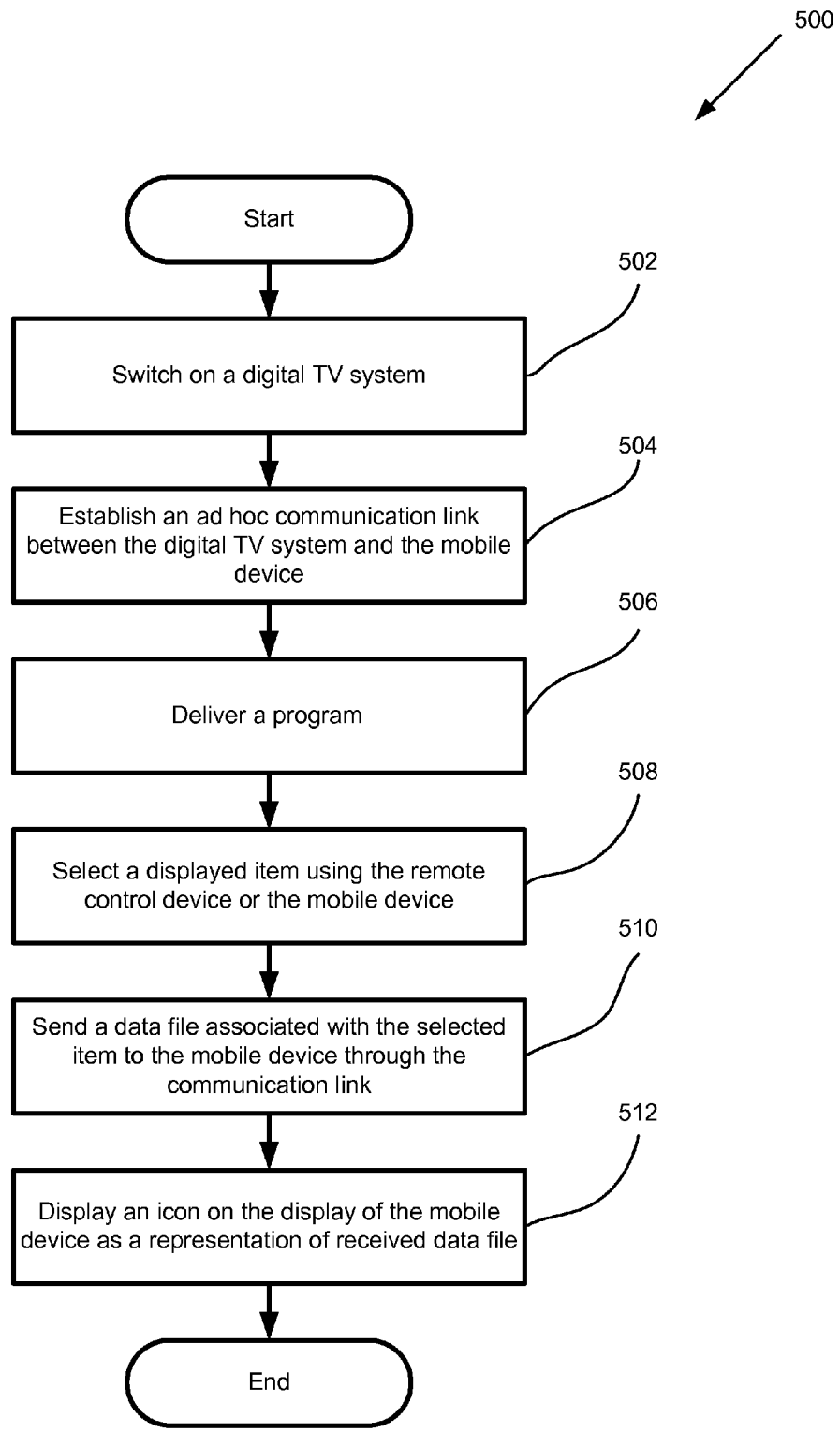
FIG. 5 is a flowchart illustrating an exemplary process that a user selects a displayed item and a data file including the product identifier is sent to the mobile device.

FIG. 5 is a flowchart illustrating an exemplary process that a user selects a displayed item and a data file 304 including the product identifier is sent to the mobile device 106. Process 500 begins with switching on the digital television system 102 in step 502. An ad hoc communication link 114 is established in step 504 between the digital TV system 102 and the mobile device 106. The communication link 114 may be a Bluetooth connection in an exemplary implementation. The communication link may also be a NFC including a RF tag in the digital TV system 102 and a reader in the mobile device 106 in another exemplary implementation. The data file 304 may be sent to the tag first before it is readout by the reader in the mobile device 106.

A TV program comprising a series of frames is selected and delivered in step 506. At least some of frames may include commercial items selectable by the user using the remote control device 104 or using the mobile device 106. Upon selection of the digital TV program, a database associated with the program is delivered from a server in the digital TV network to the digital TV system 102. The database may comprise product identifiers of displayed commercial items in the frames of the program. The database may also include other advertisement files related to the commercial items. The database may be delivered to digital TV system 102 in a single step. The database may be delivered to the system 102 in multiple steps according to the progress of broadcasting of the program.

During the broadcasting of the program, if the user is attracted by one of the displayed items, he may select the item using the remote control device 104 or the mobile device 106 in step 508. The data file 304 is then sent from the digital TV system 102 to the mobile device 106 in step 510 through the ad hoc communication link 114. The data file 304 may include the product identifier of the selected item. The data file 304 may also include related advertisement files for the selected item. The advertisement files may be in a text format, a voice format, an image format or a video and multimedia format. The data file 304 is generated by the advertisement delivery manager 412 upon the user's selection of the displayed item. An icon 107 representing the received data file 304 is displayed on the display screen of the mobile device 106 in step 512.

Figure 6:
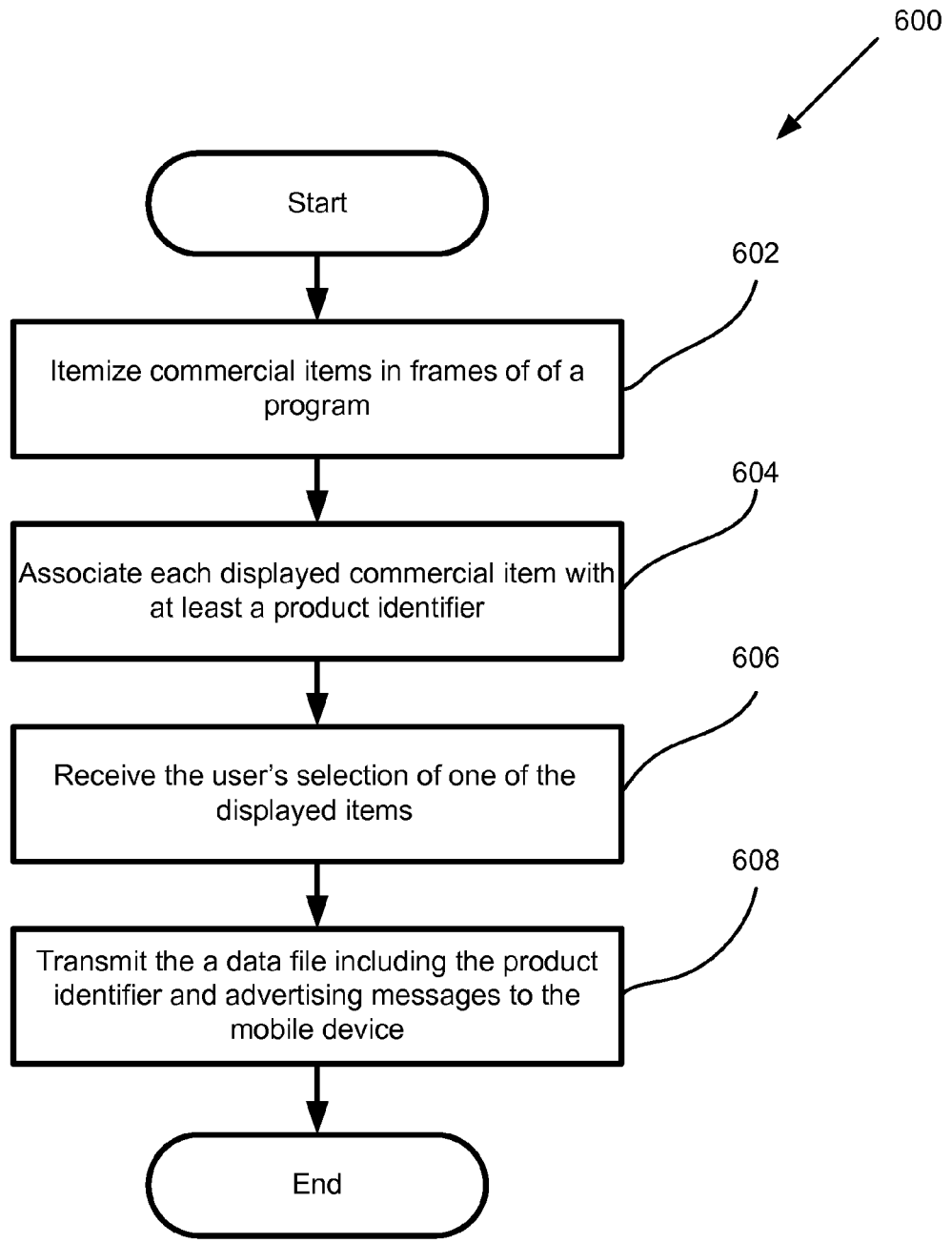
FIG. 6 is a flowchart illustrating an exemplary process that displayed items in a program are itemized and are sent to a user after the user's selection.

FIG. 6 is a flowchart illustrating an exemplary process that displayed items in a program are itemized and are sent to a user after the user's selection. Process 600 starts with step 602 that commercial items in all displayed frames of a digital TV program are itemized. Each item is associated with a product identifier in step 604. The product identifiers may be generated based upon a commonly accepted standard. When a frame is displayed, a displayed commercial item is defined by a zone on the display plane. When the user moves the optical mark such as a cursor into the zone, the user's action on an input structure of the remote control device 104 or the mobile device 106 generates a control signal in step 606. The control signal triggers an operation by the advertisement delivery manager 412 to create a data file 304 including the product identifier and/or the related advertisement files. The data file 304 is transmitted to the mobile device 106 in step 608.

Figure 7:
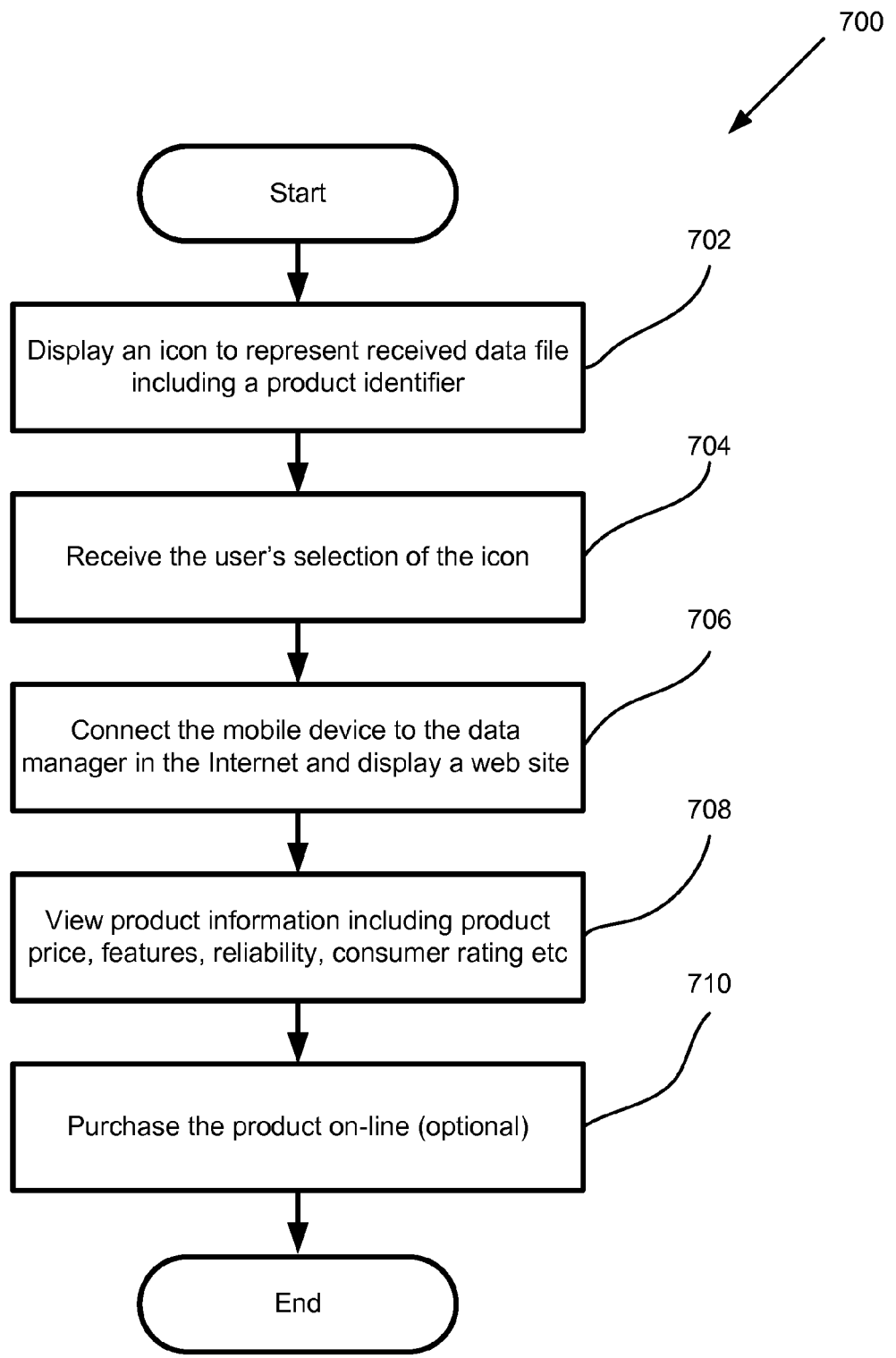
FIG. 7 is a flowchart illustrating an exemplary process that an icon is used to represent the received data file and more detailed information about the product is delivered from a data manager connected to the Internet.

FIG. 7 is a flowchart illustrating a process that detailed product information is sent to the mobile device 106 from the data manager 110 through the Internet 108. Process 700 starts with step 702 that the icon 107 representing the received data file 304 is displayed on the screen of the mobile device 106. The display may be a touch sensitive screen according to one implementation. The user (viewer) may touch the icon 107 in step 704 to request the detailed product information. The mobile device 106 and the data manager 110 are connected through the Internet 108 in step 706. The data manager 110 may be an operator to provide detailed product information upon a request. The data manager 110 may be connected to retailers, advertisers and consumer rating organizations. After they are connected, a web page may be displayed. The product information represented by the product identifier may be delivered to the user 112 in a hierarchical manner as known in the art. In step 708, the user may navigate through the user interface and find useful information related to the product. In step 710, the user may decide to purchase the product through an on-line facility after reviewing the product information.

The user's operation may be tracked and data may be collected and be sent back to the digital TV system 102. The advertisers may be paid based on which product identifiers are downloaded by the viewer and also by which product the user purchased through the on-line facility.

The invention claimed is:

1. An advertisement delivery system comprising:
    a. a digital television system for rendering a video program comprising a series of frames, at least one of said frames further comprising commercial items associated with a plurality of product identifiers included in a data file, wherein said data file is transmitted from a server to the digital television system through a communication network;
    b. a remote control device;
    c. a mobile communication device; and
    d. a Near-Field-Communication link comprising a reader and a data storage tag, wherein the reader is located in said mobile device and the tag is located in said digital television system,
        wherein a product identifier is stored into said data storage tag after a user selects one of the displayed commercial items in one of the frames by the remote control device,
        wherein said reader in said mobile communication device receives a data file including at least the product identifier in said tag,
        wherein a processor in said mobile communication device displays an icon on a display of said mobile communication device, said icon is a representation of the product identifier and detailed advertising message associated with the product identifier is transmitted from a server in a communication network and is displayed on the display of the mobile communication device upon the user's selection of said icon through a user input device of said mobile device.

2. The system as recited in claim 1, wherein said remote control device further comprises a dedicated input device for triggering of transmitting the data file from the tag in the television system to the reader in the mobile communication device.

3. The system as recited in claim 1, wherein said remote control device further comprises a user interface program including a means of user selecting one of the displayed items from one of the frames.

4. The system as recited in claim 1, wherein said digital television system further comprises:
   a. a processor; and
   b. a communication unit for connecting to a communication network.

5. The system as recited in claim 1, wherein said mobile communication device further comprises:
   a. a data storage unit; and
   b. a communication unit for connecting to a public communication network.

6. The system as recited in claim 1, wherein said detailed advertising message is rendered in multimedia forms.

7. The system as recited in claim 1, wherein said detailed advertising message is rendered in image forms.

* * * * *